US005485388A

United States Patent [19]
Dutto et al.

[11] Patent Number: 5,485,388
[45] Date of Patent: Jan. 16, 1996

[54] COMPUTERED SYSTEM OF ROTATIVE ACTION FOR THE SYNCHRONIC MOTION OF PRODUCTS IN A MANUFACTURE LINE

[75] Inventors: Ivo Dutto; Alfonso Arechaga, both of Llodio, Spain

[73] Assignees: Vidrala S.A.; Avacon, S.A., both of Spain

[21] Appl. No.: 200,748

[22] Filed: Feb. 23, 1994

[51] Int. Cl.⁶ .................................................. G06F 15/46
[52] U.S. Cl. .............................. 364/473; 364/469; 65/163
[58] Field of Search ................................. 364/473, 468, 364/469, 470, 471, 472; 65/160–163

[56] References Cited

U.S. PATENT DOCUMENTS

| | | | |
|---|---|---|---|
| 4,203,752 | 5/1980 | Becker eet al. | 65/163 |
| 4,247,317 | 1/1981 | Wood et al. | 65/29 |
| 4,313,750 | 2/1982 | Lulejian et al. | 65/160 |
| 4,409,013 | 10/1983 | Cardenas et al. | 65/163 |
| 4,457,772 | 7/1984 | Haynes et al. | 65/160 |
| 4,547,211 | 10/1985 | Ananias | 65/29 |
| 4,615,723 | 10/1986 | Rodriguez-Fernendez et al. | 65/163 |
| 4,636,238 | 1/1987 | Sidler | 65/29 |
| 4,708,727 | 11/1987 | Cardenas-Franco et al. | 65/29 |
| 4,876,652 | 10/1989 | Gardner | 364/473 |

*Primary Examiner*—Roy Envall
*Assistant Examiner*—Cameron H Tousi
*Attorney, Agent, or Firm*—Lucas & Just

[57] ABSTRACT

A computerized system for the continuous manufactured of individual elements, notably glass containers, is disclosed. A pulse sensor which emits one pulse per cycle is connected to an asynchronous motor with a frequency variator. A CPU is programmed with a synchronism equation that orders the increase or reduction of frequency of each variator according to the pulses received by the CPU programmed with the synchronism equation.

10 Claims, 2 Drawing Sheets

COMPUTERED SYSTEM OF ROTATIVE ACTION FOR THE SYNCHRONIC MOTION OF PRODUCTS IN A MANUFACTURE LINE

In the continuous manufacture of individual elements, the problem of synchronization of the devices for feed, conveyance, treatment, etc. of said elements arises, for example, in the production of glass containers.

It has been attempted to solve the problem through the use of synchronous motors with a frequency synthesis from a standard, but this solution is very expensive and demands very precise and complex adjustment, without the necessary accuracy ever being achieved, because of the impossibility of synthesizing the different relations of the periodic fractions of the frequencies.

The applicant has found an inexpensive and simple solution to the complex problem mentioned.

The applicant uses in each stage of manufacture a pulse sensor or detector, which emits one pulse per cycle, an asynchronous motor with a frequency variator and a CPU programmed with a synchronism equation that orders the increase/reduction of frequency of each variator, that is, of the rate of circulation in each stage, by virtue of the pulses received and of the program mentioned.

Figure 1:
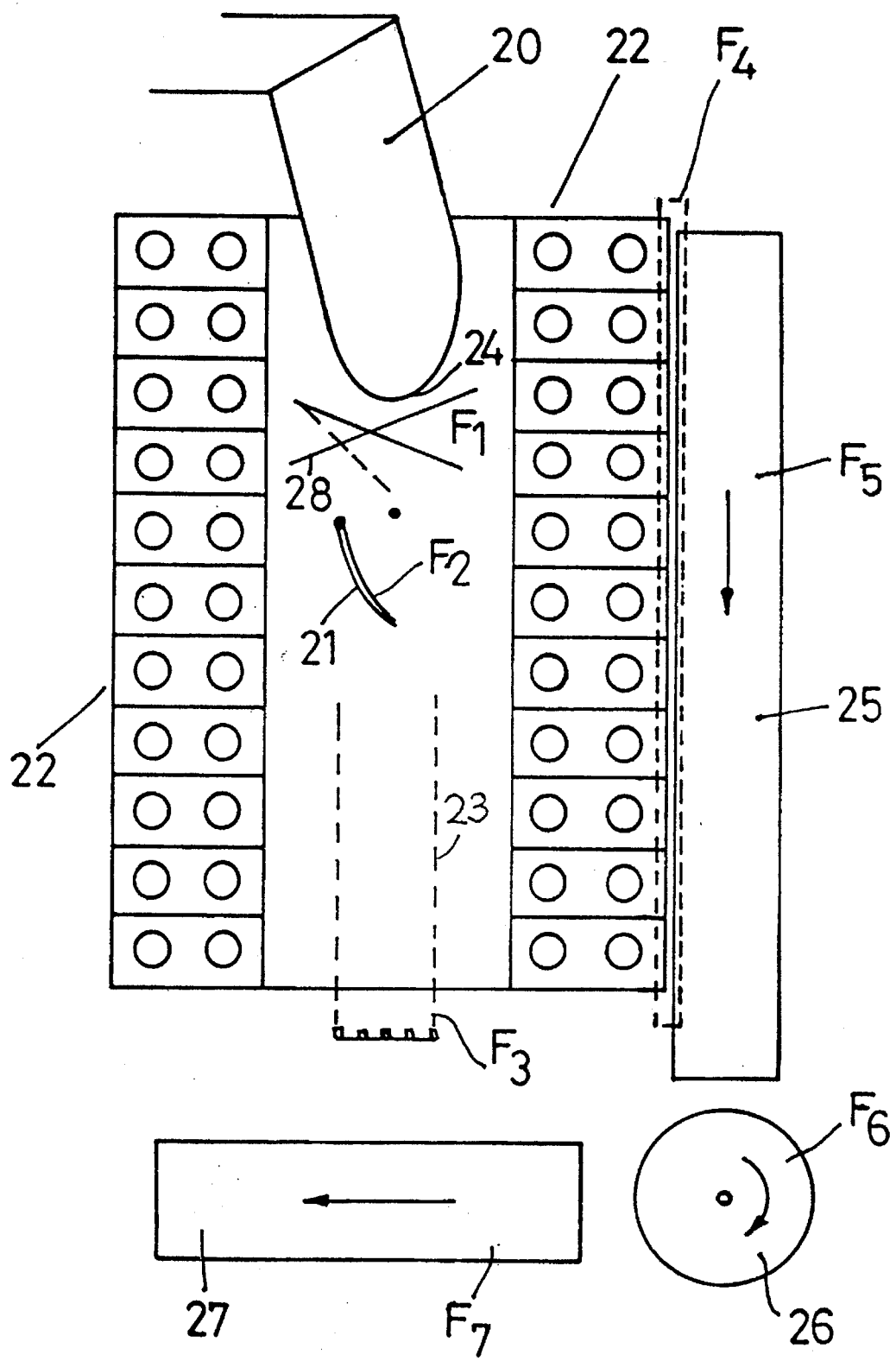
FIG. 1 is a schematic representation of a part of a glass bottle production installation in which the system which is the subject of the invention is applied.

The system can be developed for a complete installation, but a part of same has been represented to simplify its explanation.

In glass bottle production installations, all the chemical components that are going to form part of the glass are mixed. In a second stage the chemical components are homogenized.

Both stages can be controlled by the system, which is the subject of the invention, but they have not been represented on the figures for sake of simplification.

The homogenized mixture is melted in a furnace that has several outlets (20), in the bottom (24) of which appears the molten glass, cut at its outlet (stage or function) $F_1$ into drops (pieces) by a cutting device (28), which will give rise to the bottles.

The drops mentioned are sent by means of a distributor (21) (stage $F_2$) to molds (22) that are sequenced to receive the corresponding drop by a drum (23) (stage $F_3$).

Once the bottles are shaped, an extractor (stage $F_4$) moves them from the molds (22) to the machine conveyor belt (25) that moves them (stage $F_5$) to a transfer wheel (26) (stage $F_6$) which transfers them from the first conveyor belt (25) to a box conveyor belt (27) placed perpendicular to that of the machine (stage $F_7$).

The bottles will then pass, by means of a box pusher (not represented), from the box conveyor belt (27) to an annealing box (not represented).

Figure 2:
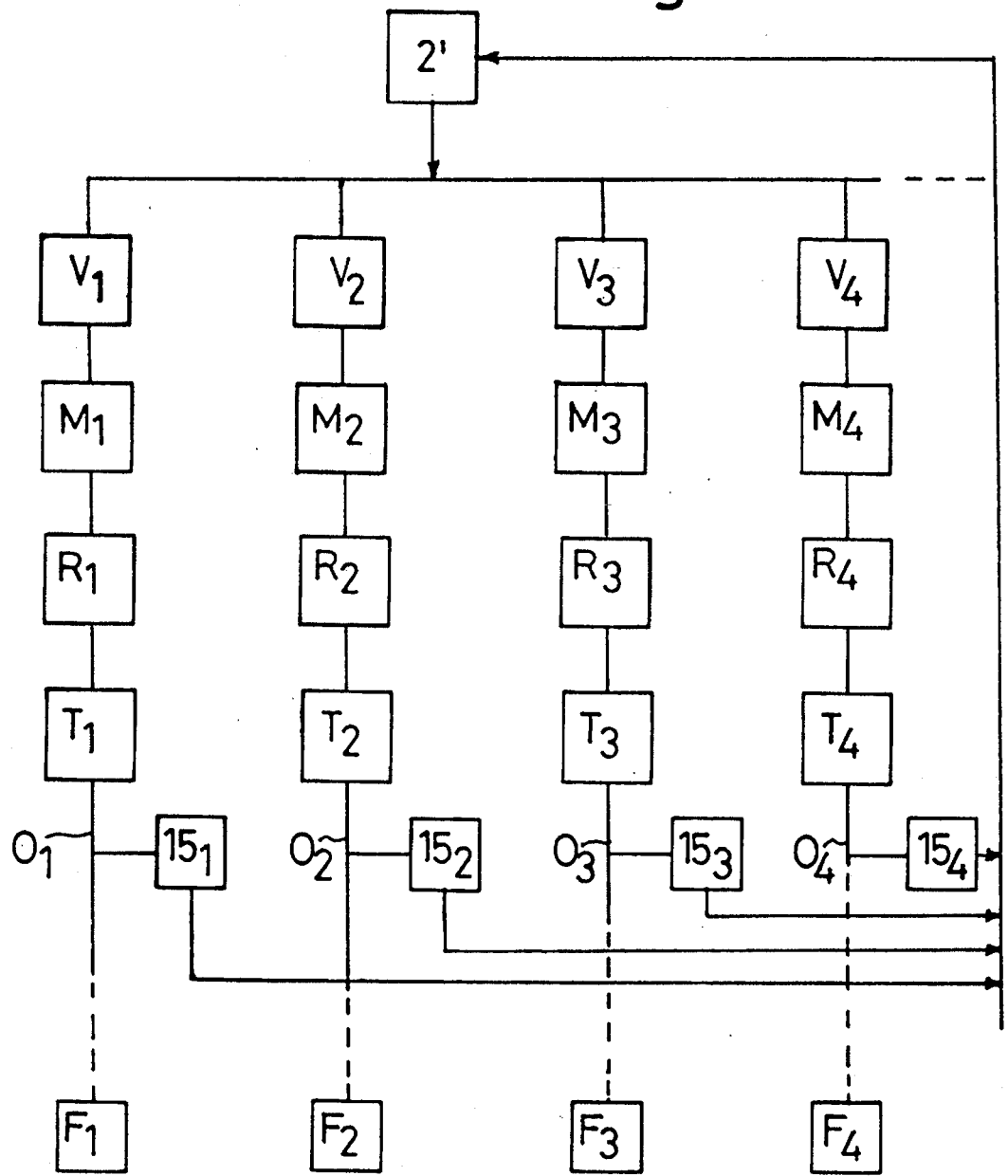
FIG. 2 is a block diagram of the system which is the subject of the invention applied to the installation of FIG. 1.

On FIG. 2 some asynchronous motors $(M_1)$, $(M_2)$, $(M_3)$, $(M_4)$ . . . have been schematically represented; by means of reducers $(R_1)$, $(R_2)$, $(R_3)$, $(R_4)$ . . . , they drive mechanical devices $(T_1)$, $(T_2)$, $(T_3)$, $(T_4)$ . . . which operate the function stages $(F_1)$, $(F_2)$, $(F_3)$, $(F_4)$ . . . that have been previously explained.

All of the stages $(F_1)$, $(F_2)$, $F_3)$, $(F_4)$ are cyclic, as the concatenated movements of the asynchronous motor (M), reducer (R) and mechanical device (T).

The cycle will preferably be considered repetition of the movement at the outlet or end $(O_1)$, $(O_2)$, $(O_3)$, $(O_4)$ . . . of the mechanical drive device, with which a fixed number of bottles per cycle has been previously associated, with the cutting device $(T_1=28)$ two bottles per cycle, with the transfer wheel $(26=T_6)$ eight bottles per cycle, etc.

All of these relations, like the mechanical and cyclic relations between the elements of the same stage, are introduced in a CPU (2') that controls the installation and the process.

The chain of stages $(F_1)$, $(F_2)$, $(F_3)$, $(F_4)$ . . . is rigid, in the sense that the flow of bottles cannot be compressed, as if it were a liquid, since on its path there is no appearance/disappearance of bottles. In operation, the quantity of bottles delivered in one stage (Fi) has to be equal to the quantity of bottles delivered by the following stage (Fi+1).

At the outlet (O) or final point of the corresponding mechanical device (T) there is a single sensor $(15_1)$, $(15_2)$, $(15_3)$, $(15_4)$ . . . that emits one pulse per cycle, sending its signal to the CPU (2'), which calculates the number of bottles (Ni) corresponding to that concrete cycle and adds it to the cumulative quantity of bottles corresponding to that phase (Fi) (cumulative flow) $(C_{Fi}^{EFi})$.

Generalizing, it can be stated that starting from an instant of synchronism, the following equation must be executed in order to maintain same $$C_{ts}^{EFi} - C_{ts}^{EFj} = C_{ti}^{EFi} - C_{ti}^{EFj} = D_{ts}^{ij} \tag{1}$$

or what is the same thing:

In the above equation, the symbols are defined as follows:

ti=any instant ts=instant of synchronism $C_{ts}^{EFi}$ and $C_{ti}^{EFi}$=cumulative quantity of bottles conveyed in stage Fi at instant ts and at instant ti respectively $C_{ts}^{EFj}$ and $C_{ti}^{EFj}$=cumulative quantity of bottles conveyed in stage Fj at instant is and at instant ti respectively $D_{ts}^{ij}$=difference in bottles conveyed between stages Fi and Fj at instant ts.

At any instant (ti) the cumulative quantity $(C_{ti}^{EFi})$ of bottles conveyed by one stage (Fi) and the cumulative quantity $(C_{ti}^{EFj})$ of bottles conveyed by any other stage (Fj) must differ by the same quantity $(D_{ts}^{ij})$ as they would differ at the instant of synchronism (ts), since at $C^{EFi}$ CEFj that moment (ts) there are $C_{ts}^{EFi}$, $C_{ts}^{EFj}$ bottles in stages Fi, Fj respectively, with the results that:

$$C_{ti}^{EFi} = \Sigma Ni \times No. \ cycles + C_{ts}^{EFi} \tag{2}$$

Ni being the quantity of bottles conveyed per cycle of stage Fl.

The instant ts of synchronism is determined manually or automatically; for example, the CPU (2'), at the start of operation of the system or after an interruption, decides synchronism when the derivatives of the equation (1) (in practice, their discrete differences ) coincide for each stage (F). At the instant (ts) known or decided by the CPU (2'), the CPU itself calculates the difference datum $D_{ts}^{ij}$ which, with its clock for the calculation of times and the constants already mentioned, receives the pulses from the corresponding sensors $(15_1)$, $(15_2)$, $(15_3)$, $(15_4)$ . . . and calculates the real differences $D_{ti}^{ij}$ at instant (ti) and calculates the differential between the difference $D_{ts}^{ij}$ necessary to maintain synchronic operation and the real difference $D_{ti}^{ij}$.

Once the calculation is made and within certain preestablished thresholds, it calculates the variation of frequency $(f_i)$ necessary for each asynchronous motor $(M_1)$, by accelerating/decelerating, to place its stage Fi in synchronism or, what is the same thing, for $$D_{ti}^{ij} \dashrightarrow D_{ts}^{ij}$$

the real difference tends to the theoretical or initial difference.

Once the variation of frequency (fi) is calculated, it orders the corresponding frequency variator $(V_1)$, $(V_2)$, $(V_3)$, $(V_4)$ ... to vary the frequency (fi) of the corresponding asynchronous motor $(M_1)$, $(M_2)$, $(M_3)$, $(M_4)$ ... in the direction indicated, ie acceleration or deceleration.

The operator or the programmed CPU (2') can decide on the value of the theoretical difference $D_{ts}^{ij}$ with which, when the installation is restarted, synchronism is decided, once the real difference in stages (Fi) (Fj) attains the value of difference $D_{ts}^{ij}$.

It is preestablished that an outside element or outlet (Oi) of one of the mechanical devices (Ti) is the master, so that said outlet (Oi) or its corresponding phase (Fi) is that of comparison for all the rest.

It is to be understood that the term bottle can be substituted by the term element, for the subject of the invention can also be applied to other types of installations.

We claim:

1. A computerized rotary drive system for the synchronized movement of individual elements comprising:
   a) a series of unit blocks constituted by a mechanical device (Ti), driven by asynchronous motors (Mi) that carry out a cyclic stage (Fi) for each of them;
   b) at least one sensor (15i) in each stage (Fi), each said sensor emitting one pulse per cycle, and sending a signal to a CPU (2') programmed with the synchronism equation $$C_{ts}^{EFi} - C_{ts}^{EFj} = C_{ti}^{EFi} - C_{ti}^{EFj} = D_{ts}^{ij};$$

wherein:

ti=any instant ts=instant of synchronism $C_{ts}^{EFi}$ and $C_{ti}^{EFi}$=cumulative quantity of individual elements conveyed in stage Fi at instant ts and at instant ti respectively $C_{ts}^{EFj}$ and $C_{ti}^{EFj}$=cumulative quantity of individual elements conveyed in stage Fj at instant ts and at instant ti respectively $D_{ts}^{ij}$=difference in individual elements conveyed between stages Fi and Fj at instant ts said CPU calculating the real difference $D_{ti}^{ij}$ in individual elements conveyed between any two stages (Fi) (Fj) at any instant (ti) and by comparison with the difference $D_{ts}^{ij}$ calculating a frequency variation (fi) that orders the frequency variator (Vi) to act on the corresponding asynchronous motor (Mi) and modify its operation to attain the result that the real difference $(D_{ti}^{ij})$ and synchronism difference $(D_{ts}^{ij})$ will tend to equality.

2. The computerized rotary drive system for the synchronized movement of individual elements according to claim 1, wherein the instant of synchronism (ts) is decided by the CPU (2') when the discrete differences of the derivatives of the synchronism equation coincide for every two stages (Fi) (Fj).

3. The computerized rotary drive system for the synchronized movement of individual elements according to claim 2, wherein a preestablished outside element of the unit block of a stage (Fi) is the master of comparison for all the rest.

4. The computerized rotary drive system for the synchronized movement of individual elements according to claim 2, wherein the synchronism difference value $D_{ts}^{ij}$ is preestablished.

5. The computerized rotary drive system for the synchronized movement of individual elements according to claim 1, wherein the sensor (15i) is placed at the end of each mechanical device (Ti).

6. The computerized rotary drive system for the synchronized movement of individual elements according to claim 1 wherein said individual elements are glass containers.

7. The computerized rotary drive system for the synchronized movement of individual elements according to claim 2 wherein said individual elements are glass containers.

8. The computerized rotary drive system for the synchronized movement of individual elements according to claim 3 wherein said individual elements are glass containers.

9. The computerized rotary drive system for the synchronized movement of individual elements according to claim 4 wherein said individual elements are glass containers.

10. The computerized rotary drive system for the synchronized movement of individual elements according to claim 5 wherein said individual elements are glass containers.

* * * * *